United States Patent Office 3,434,375
Patented Mar. 25, 1969

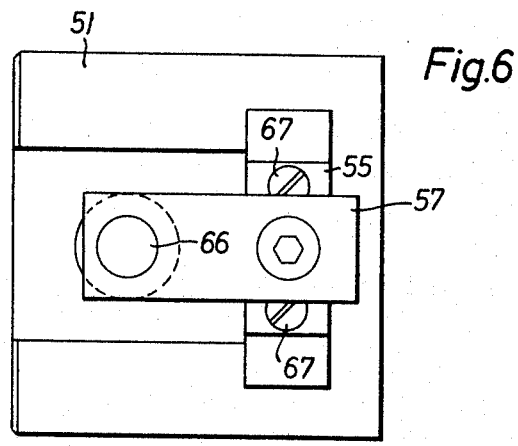
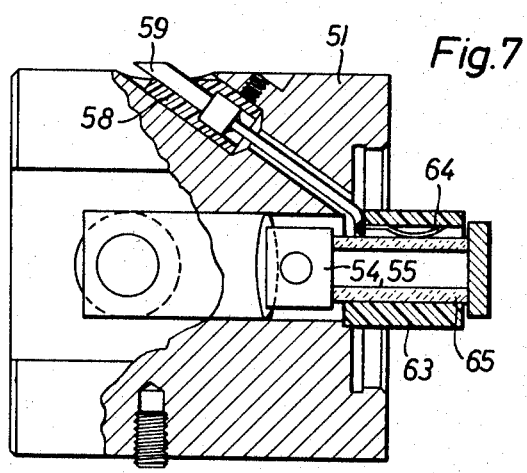

3,434,375
AUTOMATIC ADJUSTING DEVICE FOR CHIP-REMOVING TOOLS
Walter Clashausen, Remscheid, Germany, assignor to Gebruder Honsberg, Remscheid-Hasten, Germany
Filed Feb. 7, 1967, Ser. No. 614,437
Claims priority, application Germany, Feb. 8, 1966, H 58,467
Int. Cl. B23b 39/10, 47/18
U.S. Cl. 77—58                                    15 Claims

ABSTRACT OF THE DISCLOSURE

Invention relates to an adjustable tool in which a cutter element support is adjustably mounted in a holder and a piezo-electric body in the holder is expansible by electrical energy to move the support in one direction in the holder with a one way clutch to prevent retraction of the support when the piezo-electric body contracts and with adjustable means to automatically fill the space between the support and the piezo-electric body when the latter contracts.

---

The present invention relates to an automatic adjusting device for chip removing tools, especially for fine boring units, with a tool which is displaceably mounted in a tool head.

When fine boring work pieces, in addition to the boring time proper, considerable time is used for non-productive purposes, i.e. for handling, inasmuch as the boring tool has between the individual boring operations to be set and adjusted manually. In view of these non-productive or handling times, the total manufacturing time is consideraly increased with the result that a considerable economic disadvantage is encountered. Therefore, efforts have been made to automate the setting and adjusting of the fine boring tool. In this connection, measuring devices were employed which convert the ascertained measuring values into correcting values for the adjustment of the tool. According to a heretofore known device of the type involved, the adjustment of the boring tool is effected mechanically and, more specifically, by adjusting the boring tool through the intervention of a transmission linkage in the hollow fine boring spindle. At that end of the fine boring spindle which is located opposite the machining side, adjusting motors are provided the operation of which is controlled by measuring devices. These heretofore known solutions are mechanically too expensive because the entire adjusting mechanism has to be mounted free from play in the spindle and in the tool. Furthermore, these mechanical solutions of the problem above referred to have the drawback that an adjustment as to fine tolerances as it is required in the present instance cannot be carried out with sufficient precision in a mechanical way.

It has also been suggested to effect the adjustment of the tool by heat action. In such an instance, however, the heat is conveyed to the surrounding parts and occurs at an undesired area. Moreover, such a control depends on the surrounding temperature and, therefore, is rather relative.

It is, therefore, an object of the present invention to provide an automatic adjusting device for chip removing tools which will overcome the above mentioned drawbacks.

It is another object of this invention to provide an automatic adjusting device for chip removing tools which will yield a completely reliable automatic adjustment of the tool at a relatively low cost of manufacture.

It is still another object of this invention to provide an adjusting device as set forth in the preceding paragraphs, which will permit the mounting of the mechanical adjusting elements exclusively in the tool.

These and other objects and advantages of the invention will appear more clearly from the following specification in connection with the accompanying drawings, in which:

FIG. 6 is a top view of FIG. 4.

FIG. 7 is a partial longitudinal section the sectional plane of which is turned by 90° with regard to FIG. 4.

Figure 1:
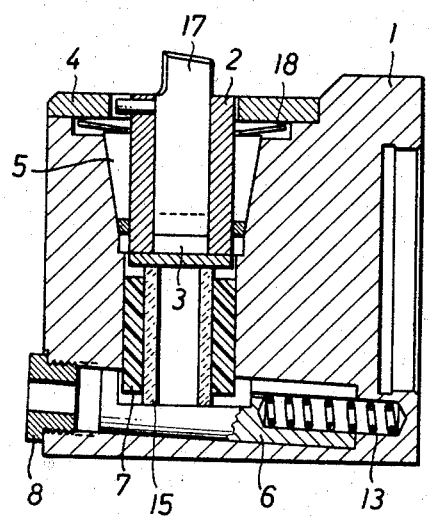
FIG. 1 is a longitudinal section through a first embodiment of a tool head according to the present invention.

The present invention is based on the well known fact that certain crystals have a so-called piezo-electric effect which consists in that these crystalline bodies when connected to an electric voltage undergo a re-orientation with regard to the crystal lattice which have inherent thereto a change in the length and width of the crystalline body. These changes in length of the crystalline body are taken advantage of according to the present invention for adjusting the tool.

The problem underlying the present invention has been solved in conformity with the present invention primarily in that in the tool head behind the tool there is arranged such a crystalline ceramic body known per se with a piezo-electric property which is electrically connectable to a voltage. The said ceramic body is mounted in the tool head on an adjusting device which, when the ceramic body shrinks, is adjustable by means of a spring for filling up the space which will be freed during such a shrinking. In other words, according to the present invention, the tool is combined with the crystalline ceramic body in such a way that when, under the action of a current, the ceramic body undergoes an extension, the tool is advanced, whereas during a subsequent shrinking of the ceramic body following the turning off of the current, the tool does not slide back but instead the above mentioned adjusting device fills in the free space. This adjusting device may be of numerous designs, and, merely by way of example, two preferred embodiments of such adjusting device employing wedges will be set forth below.

According to one embodiment of the invention, the adjusting device has transmission means by means of which the piezo-electric extension of the ceramic body is transformed into a larger advancing movement of the tool. Also for such an adjusting device numerous designs are possible while with a presently preferred embodiment two wedges are employed which are arranged at a right angle with regard to each other and which are interposed between the ceramic body and the tool, while the inclination or pitch of the wedging surface of the wedge located behind the tool is more or less steep in conformity with the desired transmission.

With the presently preferred embodiments of the invention, the adjusting device comprises at least one wedge which by means of a spring is adjustable in the direction of the surface incline of the wedge and is journalled in the tool head. To this end, according to one embodiment of the invention, the tool which is displaceable in radial direction in the tool head has its rear end in engagement with the ceramic body, whereas the other end of the ceramic body is located in the direction of extension of the tool and rests against a wedge which is displaceable in axial direction. Furthermore, in the direction of the axial extension of the wedge there is provided a spring which engages on one hand the tool head and on the other hand the wedge.

According to another embodiment of the invention which permits a step-up or step-down of the feeding stroke and permits a higher precision adjustment, the tool which is displaceable in radial direction in the tool head has its rear end in engagement with a first wedge displaceable in axial direction, which first wedge has its rear end engaged by a second wedge displaceable in radial direction. Furthermore, the ceramic body, with regard to the first wedge, rests against the second wedge and is located in the tool head.

Figure 2:
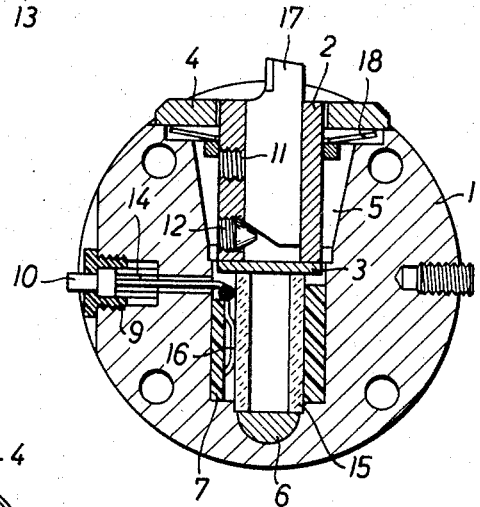
FIG. 2 represents a cross section through the tool head of FIG. 1, said section being taken along the line II—II of FIG. 1.
Figure 3:
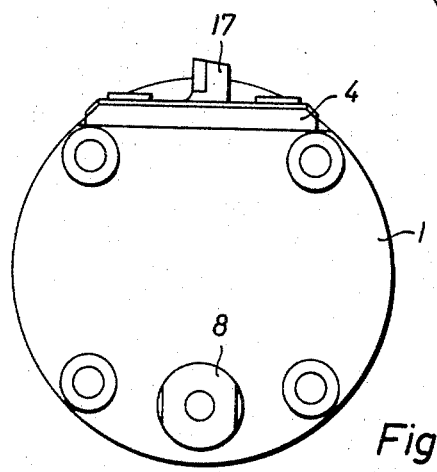
FIG. 3 is an end view of FIG. 1 as seen in the direction of the arrow A.

Referring now to the drawings in detail and, more specifically, to FIGS. 1 to 3, it will be noted that the boring tool 17 is displaceably mounted in radial direction in the boring head 1. Tool 17 is mounted in a bushing or tool holder 2.

As will be evident from FIG. 2, the tool 17 has an inclined back side and by means of a first threaded pin 12 is adjustable in the longitudinal direction with regard to the bushing 2, said pin 12 having a conical end 12a. The arresting of tool 17 in tool holder 2 is effected by means of a second threaded pin 11 which similar to pin 12 is screwed through the wall of the tool holder 2.

As will be obvious from FIG. 1, the tool holder 2 is mounted within a bore 1a which flares in upward direction. The space between the tool holder 2 and the wall of said bore 1a may, if desired, be filled by a multi-sectional wedge or clamping sleeve 5. The upper end of sleeve 5 is engaged by a dish spring 18 which is held on the boring head 1 by means of a cover 4. It will be noted that in view of the described mounting of the tool holder 2 in the boring head 1 an adjustment of the clamping sleeve 5 and the tool 17 toward the outside will be possible while a sliding back of the tool holder 2 in the boring head 1 is possible only when the clamping sleeve 5 is lifted against the thrust of spring 18.

Arranged below the tool holder 2 there is provided a spacer disc 3 the bottom side of which is engaged by a crystalline ceramic tube 15 which has piezo-electric properties. Arranged in the ceramic tube 15 is an insulating bushing 7. Eccentrically located in the boring head 1 and extending in axial direction is an adjusting wedge 6 (FIG. 2) which within the range of its wedging surface has a semicircular cross section, the wedging surface of wedge 6, when looking at FIG. 1, rises from the left toward the right. The adjusting wedge 6 is located in a bore of the boring head 1, said bore being closed at the outer end thereof by means of a closure screw 8. At the right-hand end of wedge 6 there is provided a bore 6a having mounted therein a pressure spring 13. Spring 13 rests against the boring head 1 and continuously urges wedge 6 to move toward the left with regard to FIG. 1.

In the interior of the insulating bushing 7, a contact spring 16 rests against the ceramic tube 15 and through a current feeding wire is connected to a cable shoe 10 on the outside of the boring head 1. Cable shoe 10 is held in the boring head 1 by means of an insulating screw 9, while a spacer tube 14 represents the insulating guiding means for an electric cable to spring 16.

A change in the longitudinal direction of a piezo-electric crystalline body can be obtained by an alternating current, by a pulsating direct current, or by a constant direct current. When employing an alternating current, the crystalline body will expand with each positive half wave and will contract with each negative half wave. The same effect can be obtained by means of a pulsating direct current. On the other hand, however, the change in the longitudinal direction with a non-pulsating direct current is directly proportional to the employed voltage. The current intensity or amperage can be extremely small, for instance a few milliamperes.

In operation, the tool 17 is first by means of the pins 12 and 11 fixed in the tool holder 2 at the desired height. In this connection, the tool is adjusted for a slight minus measurement of the desired bore diameter. Following the first boring step, the prepared bore is measured by any standard measuring device, for instance by means of a Marposs measuring device. The measuring device compares the diameter of the produced bore with the intended size of the bore, and now, by means of the contact resiliently engaging the end face, an electric connection to the contact spring 16 is established. Thereupon, for instance an alternating current is turned on and passed through the measuring instrument precisely for the time period required in conformity with the ascertaintd measurement in order to adjust the tool as far as possible to the outermost plus tolerance limit. With each positive half wave of the alternating current and correspondingly with each impulse of a pulsating direct current, tube 15 expands and moves the tool 17 toward the outside. With each negative half wave of the alternating current (and with each intermediate impulse of the pulsating direct current) the tube 15 contracts again. However, as mentioned above, the tool 17 cannot slide back. The space which during a contraction of the tube 15 becomes free behind said tube 15 is filled up due to the fact that the wedge 6 under the influence of spring 13 is displaced toward the left. This feeding movement of the tool 17 continues as long as the current remains switched on, and it has been mentioned above that the term for which the current remains switched on is adjusted by the measuring device in conformity with the difference between the measured value and the desired or rated value. When the tool has worn and has to be exchanged, the adjusting wedges are manually returned to their starting position.

When employing a non-pulsating direct current, the extension of the tube 15 in longitudinal direction thereof depends on the magnitude of the voltage. The adjustment of the tool 17 is effected accordingly.

With the embodiments of the invention illustrated in FIGS. 4 to 7 a finer adjustment can be obtained and the magnitude of the change in length of the ceramic tube is converted into a longer or shorter feeding stroke of the tool. Also with this embodiment, in the boring head 51, the boring tool 66 is radially displaceable in a tool holder or a bushing 53. The connection of tool 66 in tool holder 53 may be effected in conformity with the embodiment of FIGS. 1 to 3 by means of threaded pins 61 and 62.

Figure 4:
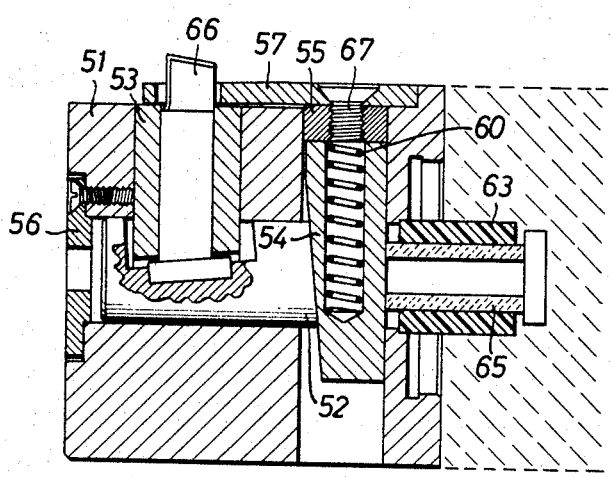
FIG. 4 represents a longitudinal section through a second embodiment of the present invention.
Figure 5:
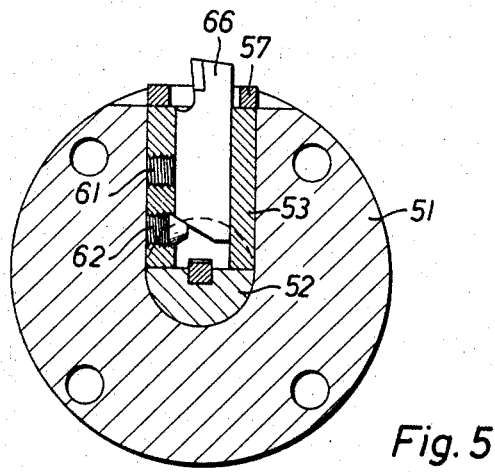
FIG. 5 is a cross section through FIG. 4 taken along the line V—V of FIG. 4.

In an axial bore of the boring head 51 there is longitudinally displaceably mounted an adjusting wedge 52 the wedge surface of which rises toward the right with regard to FIG. 4 and which rests against the back side of the tool holder 53. The front end of the bore 52a which receives the wedge 52 is closed by means of a cover 56 connected to the boring head 51 by screws 56a (one only being shown). A further wedge 54 engages the slant rear end 52b of the wedge 52. Wedge 54 is located in a radial bore of the boring head 51 and is held in said bore by means of a plate 55 connected to head 51 by screws 67. Wedge 54 has a blind bore 60a in which a pressure spring 60 is so located as to continuously urge wedge 54 to move in downward direction with regard to FIG. 4.

Opposite the wedge 52, a tube 65 engages wedge 54. This tube 65 consists of a crystalline material with piezoelectric properties and is mounted in an insulating bushing 63 to which it is connected in the boring head 51.

The current supply (FIG. 7) is made effective in conformity with the embodiment of FIGS. 1 to 3 by means of a contact spring 64 which in the insulating bushing 63 engages tube 65 and has an electric connection to a cable shoe 59 on the outside of the boring head 51. An insulating bushing 58 insulates the electric connection with regard to the boring head 51. A leaf spring-like plate 57 is arranged on the top side of the boring head 51.

The operation of the embodiment of FIGS. 4 to 7 corresponds to that of the embodiment of FIGS. 1 to 3 with the exception that when tube 65 expands under the influence of the current and when wedge 54 is turned, wedge 52 is displaced toward the left with regard to FIG. 4 whereby the tool 66 in the tool holder 53 is moved outwardly, whereas during the subsequent shrinking of tube 65, wedge 54 will, in view of the thrust of spring 60, slide downwardly and fill in the free space.

A step-up or step-down of the longitudinal expansion of tube 65 with regard to the feeding magnitude of tool 66 can be realized by a corresponding selection of the inclination of the wedging surface of wedge 52.

When the measuring device in the course of a machining operation ascertains that the fine boring tool slowly wears and consequently narrower bores than intended are produced, in the vicinity of the lower tolerance limit, again an adjustmet of the tool is effected in the above described manner.

Since, when fine boring, the surface quality depends greatly on the condition of the cutting geometry of the fine boring tool, it is a matter of course that the adjustment or post-adjustment cannot be effected indefinitely. Therefore, the measuring control may be preset for a limited admissible number of adjustments. When this number of adjustments has been carried out, the machine will be automatically stopped and an exchange of the tool will have to be effected.

Figure 8:
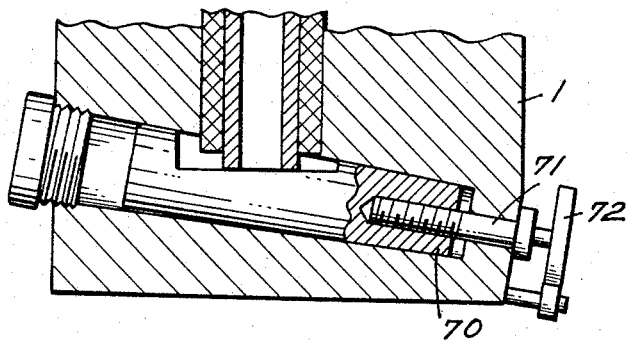
FIG. 8 is a further embodiment of a wedge-shaped adjusting device according to the present invention.

As has been mentioned above, in addition to the solutions illustrated in FIGS. 1–7 to the problems underlying the present invention there are also other solutions possible which are based on the employment of the piezoelectric effect. Thus, for instance, according to FIG. 8 the adjusting wedges in the tools may, instead of being moved directly by a spring, have one element of a nut 70 and screw 71 thereon with the other element rotatable in the holder 1 and biased by a torsion spring 72 in a direction to advance the wedge upon release of pressure thereon when the piezo-electric body contracts.

In the FIGURES 4 to 7 modification, it will be appreciated that the function of the one way clutch is performed by wedge 52 and its engagement with support means 53. The inclination of wedge 52 is such that it will not slip back toward the right once it is adjusted toward the left. A firm bearing of support means 53 on wedge 52 is insured by plate 57 which, as will be seen in FIGURE 4, bears resiliently on the outer end of support means 53.

It is, of course, to be understood that the present invention is, by no means, limited to the particular embodiments illustrated in the drawings but also comprises any modifications within the scope of the appended claims. It is also to be understood that while the present invention has been described in connection with a fine boring unit, the invention is, by no means, limited thereto but can be employed also for other purposes.

What is claimed is:

1. In an adjustable tool structure comprising a holder and tool supporting means adjustably mounted therein and adapted for receiving a cutter element, the improvement comprising; means forming a one way clutch disposed between the holder and support means operable to permit adjusting movement of the support means in the holder in one direction only, a series of abutment elements disposed between said holder and support means and at one end engaging said holder an at the other end engaging said support means, at least one of said elements comprising a piezo-electric crystal expansible for increasing the effective length of said series of abutment elements and thereby to move said support means in said one direction in said holder, at least another of said elements being automatically adjustable upon contraction of said crystal to compensate for said contraction of said crystal to keep the effective length of said series of abutment elements unchanged by said contraction of said crystal, and an electrical connection leading to said crystal.

2. An adjustable tool according to claim 1 in which said crystal is a crystalline ceramic body.

3. An adjustable tool according to claim 2 in which said series of abutment elements includes motion modifying elements disposed between said body and said support means whereby a predetermined expansion of said body will produce a different amount of movement of said support means in said one direction.

4. An adjustable tool according to claim 2 in which said other element which is automatically adjustable is a wedge, and a spring acting between the larger end of said smaller end.

5. An adjustable tool according to claim 2 in which said body disposed at the axially inner end of said support means and said other element which is automatically adjustable is a wedge disposed between the body and the end of said body opposite said support means and reciprocable in the body in the direction of the length of said wedge, and a spring action between the larger end of said wedge and said body and urging said wedge in the direction toward its smaller end.

6. An adjustable tool according to claim 2 in which support means is disposed in a bore in said holder and said means forming a one way clutch is in the form of a tapered portion in said bore, and tapered means in said tapered portion and surrounding said support means and biased toward the small end of said tapered portion of said bore.

7. An adjustable tool according to claim 3 in which said motion modifying means comprises a first wedge disposed between said support means and said holder and moveable in the holder in the direction of the length of the first wedge, a second wedge in the holder disposed between said body and said first wedge and biased in the holder toward the smaller end of the second wedge.

8. An adjustable tool according to claim 7 in which a spring is provided between said holder and the larger end of said second wedge to effect the said biasing of said second wedge toward its smaller end.

9. An adjustable tool according to claim 8 in which the larger end of said second wedge has an axial bore therein, said spring extending into said axial bore.

10. An adjustable tool according to claim 5 in which said wedge is substantially semi-circular in cross section and said body has a circular bore in which said wedge is reciprocable.

11. An adjustable tool according to claim 7 in which at least said first wedge is semi-circular in cross section and said holder comprises a circular bore in which said first wedge is reciprocable.

12. An adjustable tool according to claim 2 which includes an insulating sleeve in surrounding relation to said body, and said electrical connection comprises a contact element on the sleeve and engaging said body, and an electric cable leading into said holder and connected to said contact element.

13. An adjustable tool according to claim 2 which includes a cutter element in said support means, and means for adjusting said cutter elements in said support means and for clamping the cutter element in adjusted position in said support means.

14. An adjustable tool according to claim 7 in which said first and second wedges are in the form of a nut and screw.

15. An adjustable tool according to claim 7 in which said support means is resiliently biased toward first wedge and the angle of inclination of said first wedge is selected so the first wedge will not move due to the pressure of the support means thereon thereby providing said means forming said one way clutch.

References Cited

UNITED STATES PATENTS 2,424,524   7/1947   Weimer _____ 77—58

GERALD A. DOST, *Primary Examiner.*

U.S. Cl. X.R.

33—162; 144—93